US005110173A

United States Patent [19]

Megna

[11] Patent Number: 5,110,173

[45] Date of Patent: May 5, 1992

[54] WHEELCHAIR FOR INVALIDS

[76] Inventor: Carmine Megna, Via A. Poliziano 11, Monza 20052, Milan, Italy

[21] Appl. No.: 709,336

[22] Filed: Jun. 3, 1991

[51] Int. Cl.$^5$ .............................................. B60N 1/12

[52] U.S. Cl. ............................ 296/65.1; 297/DIG. 4; 414/343

[58] Field of Search ........................ 296/65.1; 414/343; 297/DIG. 4; 280/647

[56] References Cited

U.S. PATENT DOCUMENTS 3,865,427 2/1975 Delaney .............................. 414/343

3,937,490 2/1976 Nasr .............................. 297/DIG. 4

4,278,387 7/1981 Seguela et al. .............. 297/DIG. 4

4,354,791 10/1982 Antonelli ........................... 414/343

*Primary Examiner*—Robert R. Song

*Attorney, Agent, or Firm*—Stanley J. Yavner

[57] ABSTRACT

A wheelchair for invalids is disclosed as including a separate frame provided with wheels and made in two parts: a small chair part and a support frame. On the upper part of the support frame is a pair of first guides, which are formed and mounted to engage with a small chair upon which the user sits. The small chair is formed and adapted for sliding disengagement from the first guides, for transfer to a pair of second guides associated with an auxiliary support structure situated in the passenger cabin of an automobile.

6 Claims, 2 Drawing Sheets

WHEELCHAIR FOR INVALIDS

FIELD OF THE INVENTION

This invention relates primarily to wheelchairs and more particularly for wheelchairs for transfer of the user to an automobile passenger cabin.

BACKGROUND OF THE INVENTION

Wheelchairs generally include a support frame, a pair of principal wheels mounted on the front part of the frame, a pair of directional wheels, mounted on the rear part of the frame and a small chair mounted on the upper part of the frame. The support frame generally includes a symmetrical structure with respect to the center line axis. Wheelchairs commonly available have proven to be unstable with respect to the common occurrence when an invalid must leave the wheelchair to transfer himself, for example, into an automobile or into any other structure. Normally, the transfer takes place with the invalid first positioning his chair alongside the seat of the automobile into which he is transferring. Next, the invalid must lift himself up from the wheelchair with the strength of his own arms into the automobile seat. This operation is very tiring and hazardous for the invalid. Indeed, it is common that the intervention of a helper is necessary to keep the wheelchair motionless during the transfer procedure and/or to assist the invalid in lifting himself up from the wheelchair.

The above described transfer situation is worse when the invalid is not capable of supporting himself with his arms and/or when the invalid cannot cooperate with the helper to transfer from the seat of the wheelchair to the seat of the car.

SUMMARY OF THE INVENTION

Accordingly, a primary object of the present invention is to provide a wheelchair structure which enables easy transfer of the user from the wheelchair to a different portable structure.

A further, and more particular object, of the present invention is to provide a structure of a wheelchair which enables transfer of the small seat of the wheelchair itself, without removal of the user therefrom, to another portable structure.

These and other objects of the present invention are accomplished in a wheelchair structure which features a small chair removably connected to the support frame thereof, by use of sliding elements operatively engaged to first guides supported by the frame, in order to enable transfer to second guides mounted on an auxiliary support structure.

BRIEF DESCRIPTION OF THE DRAWINGS

Other objects, features and advantages of the present invention will become apparent by the following more detailed description of the present invention, showing a preferred, but nonetheless illustrative embodiment, with reference to the accompanying drawings, wherein.

DETAILED DESCRIPTION OF THE PREFERRED EMBODIMENT

Figure 1:
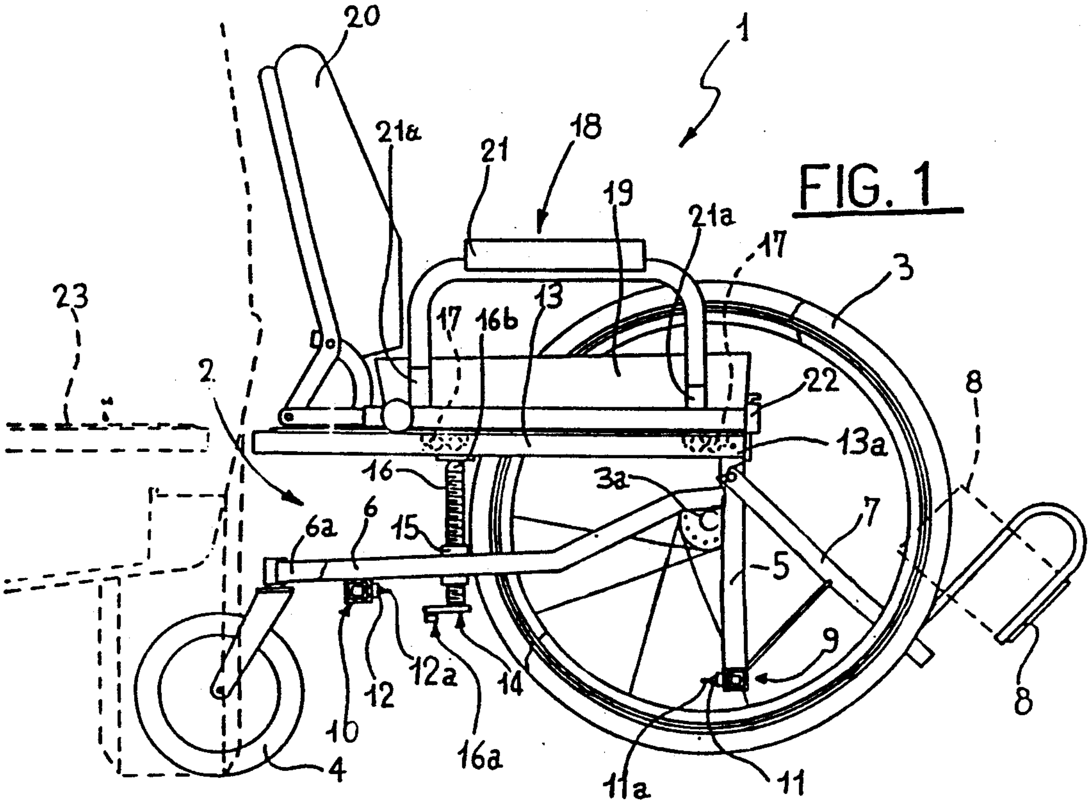
FIG. 1 is a side view, of a wheelchair according to the present invention.
Figure 2:
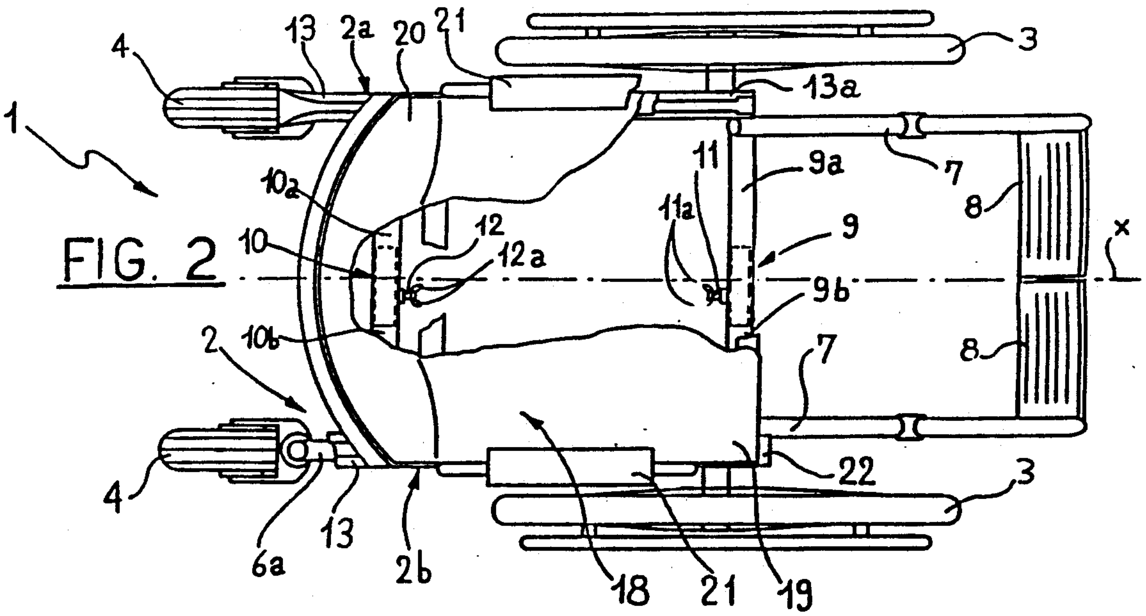
FIG. 2 is a top plan view, with partial cut-away, showing the present invention.

With particular reference to FIGS. 1 and 2, a wheelchair 1 structured according to the present invention is shown in two views.

The wheelchair includes a separate frame, generally designated 2, equipped with a pair of principal wheels 3 at the forward end of the wheelchair. A pair of directional wheels 4 is mounted rearwardly of the main support frame 2.

In particular, the frame 2 is generally composed of two semi-parts 2*a*, 2*b*, shown in FIG. 2. The two semi-parts 2*a*, 2*b* are symmetrical with respect to the center line "x" of the support frame 2. Each semi-part 2*a*, 2*b* includes a post 5 fixed to a hub 3*a* associated with one of the primary wheels 3. Joined also to each hub 3*a* of each primary wheel 3 is a rearwardly extending post 6, operatively engaged to a directional wheel 4.

Each of the semi-parts 2*a*, 2*b* includes a revolving separate arm 7 operatively engaged near the top of post 5 for supporting foot member 8.

Semi-parts 2*a*, 2*b* are removably connected by cross-pieces 9, 10, each of which includes a first portion 9*a*, 10*a*; and a second portion 9*b*, 10*b*. The first portions of the cross-pieces are in sliding engagement with second portions 9*b*, 10*b*, by means of elements 11, 12, each of which is equiped with a slide in the form of a fin or set screw with wing nut 11*a*, 12*a*, for enabling manual action.

Thus, a rigid communication between semi-parts 2*a*, 2*b* is insured, with the potential of mutually disengaging the semi-parts.

At the top of posts 5 are front extremities 13*a* of first guides 13, connected to support frame 2 by means of adjustment member 14. Adjustment member 14 is structured to enable the modification of first guides 13 in terms of inclination. The adjustment members 14 essentially provide to the rearwardly extending posts of each semi-part 2*a*, 2*b* a fixed trim element 15 that operatively engages a control screw 16 movable by rotation along a lever 16*a*. Lever 16*a*, at its upper end, includes a member 16*b*, engaged with the first guide 13. Initially, first guide 13 lends itself to operatively engage a plurality of sliding elements 17, made up of small rollers, which are carried below small chair 18.

The small chair 18 includes a seat 19, on the bottom of which are the rollers 17. The seat 18 also includes a reclinable back 20, connected at the rear of seat 19, and a pair of arms 21, connected at the opposing sides of seat 19. Arms 21 are engaged to the seat 19 by hinges 21*a* in order to be removable therefrom.

Thus, the small chair 18 is engaged at first guides 13 and blocked on the guides by means of anchorage 22. Anchorage 22 includes a swinging piston pin, engaged with seat 19 and predisposed to be released, and locked to guides 13 when the small chair is in its correct position.

Figure 4:
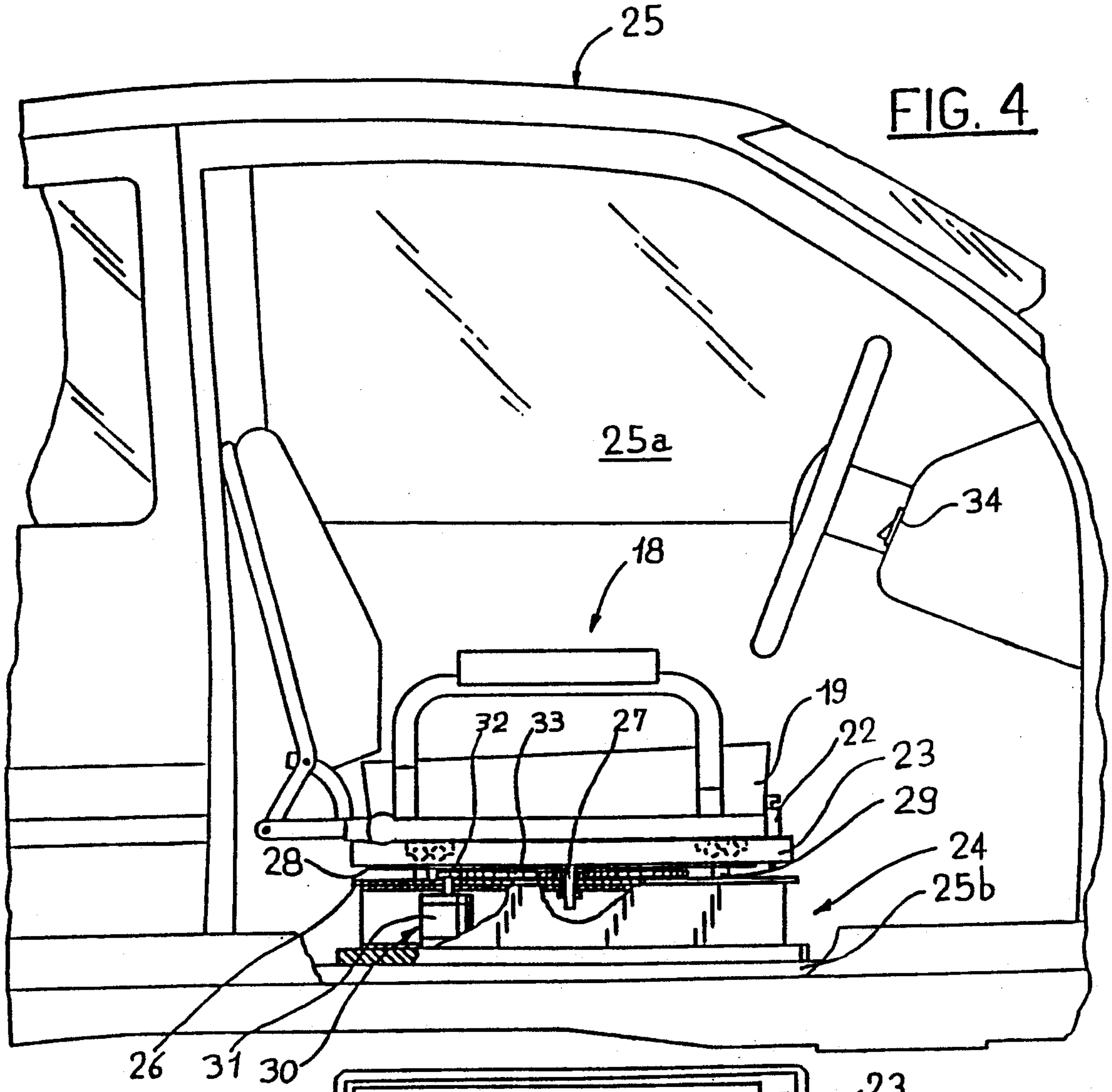
FIG. 4 is a side view of an automobile with auxiliary support structure formed and adapted to receive the small chair of the wheelchair of FIGS. 1 and 2.
Figure 3:
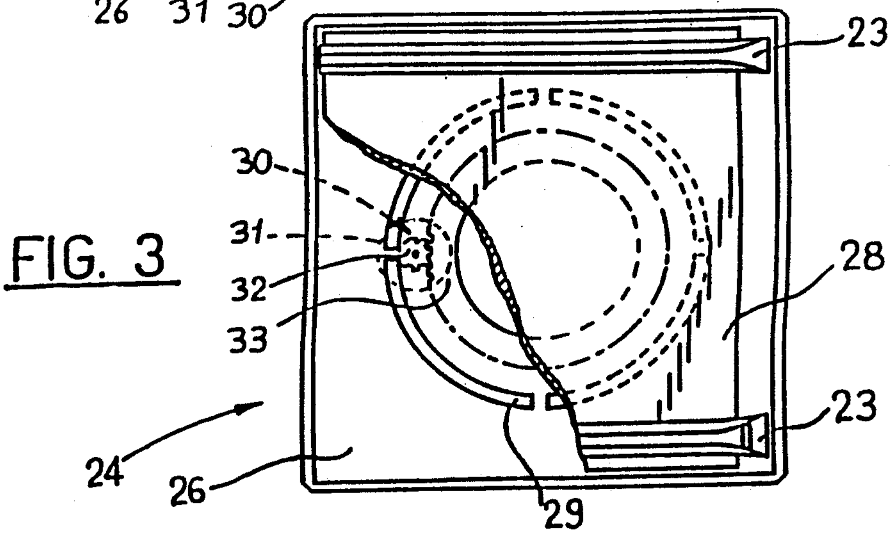
FIG. 3 is a top plan view, with partial cut-away, showing an auxiliary support structure for receiving the small chair portion of the wheelchair shown in FIGS. 1 and 2.

In accordance with the invention, the small chair 18 is slidably disengaged from first guides 13 to be transferred to second guides 23 (FIGS. 1, 3 and 4), associated with an auxiliary supporting structure, generally designated 24.

The auxiliary supporting structure 24 is mounted in the cabin 25 of an automobile, or the like. Structure 24 includes a fixed base 26, joined to the platform **25*b* of automobile 25, fixed base 26 being revolvingly engaged to automobile 25 through a hinge 27, and a revolving platform 28, which supports second guides 23**.

Preferably, revolving platform 28 is supported at fixed base 26 by the interposition of intermediate elements 29 formed of a material having a low coefficient of friction. Platform 28 is rotatable by means 30 upon the desire of the user of the wheelchair seat. In the example shown, means 30 includes an electric motor 31 joined to fixed base 26 and a pinion 32 engaged with a serrated chain 33, fixed below platform 28.

Motor 31 is activated by switch 34 placed upon the dashboard of the automobile 25, in order to control the rotation of platform 28 from a first position in which the second guides 23 are oriented toward the automobile opening (door). Platform 28 and second guides 23 are then movable to a second position (FIG. 4) in which the second guides are oriented longitudinally with respect to the vehicle.

In order to more fully explain the invention in detail, a series of use steps for the invention will now be described.

When the small chair 18 is blocked by anchorage 22 to the first guides 13, the wheelchair 1 lends itself to common usage. When it is desired to transfer the small chair 18 from support frame 2 to another auxiliary support structure 24, the user moves his wheelchair near the automobile door so that the first guides 13 are aligned with the second guides 23 of the auxiliary support structure 24. At this point, second guides 23 are in the first position previously specified.

Control screws 16 are usable to modify the rear extremities of first guides 13 in order to bring them to the level of the second guides 23. Anchorage 22 is then unblocked so that the small chair is slidable along first guides 13 to transfer to second guides 23. Such a transfer operation can be executed by the user of the wheelchair himself, by means of a pushing motion on principal wheels 3, which allows the small chair to move rearwardly.

Thus, the transfer of the small chair is performed, whereby small chair 18 is moved from support frame 2 to auxiliary support structure 24 mounted in automobile 25.

Control screws 16 are central to the alignment of first guides with respect to second guides.

After transfer of small chair 18, with the user thereon, electric motor 32 is prompted to rotate platform 28 in order to rotate the small chair 18 in a manner to align it with the automobile 25, Anchorage 22 is then used to lock the small chair 18 onto second guides 23.

Advantageously, unscrewing trim elements 11, 12, associated with posts 9, 10 makes it possible to disengage semi-parts **2*a*, 2*b* of frame 2 in order to place frame 2** in the automobile.

In order to leave the vehicle 25, the preceding operations are executed in reverse, whereby switch 34 is used to rotate platform 28 a one-quarter turn from longitudinal alignment with the automobile to a position facing outwardly of the automobile door. Frame 2 is then placed in a position so that first guides 13 can be adjusted to receive transfer of small chair 18 from second guides 23.

By means of the foregoing structure, a convenient and safe wheelchair system is provided in the present invention, which is only to be limited by the following claims.

What is claimed is:

1. A wheelchair for invalids, for selective movement to second guides on an auxiliary support structure, comprising:

(a) a support frame;

(b) a pair of principal wheels mounted on the front part of said support frame;

(c) a pair of directional wheels mounted on the rear part of said frame;

(d) a small chair mounted on the top part of said frame, and being removably connected to the frame; and first guides supported by the frame and for connecting said small chair to said frame, said small chair being disengaged by sliding on the first guides to be transferred to said second guides mounted on said auxiliary support structure, wherein said auxiliary support structure is provided and comprised of a fixed base, a rotating platform engaged on the fixed base, second guides carried by said platform, and means for rotating said platform.

2. The wheelchair according to claim 1, wherein said auxiliary support structure is mounted inside an automobile, said platform being able to rotate approximately 90 degrees, from a first position in which the second guides are oriented toward an opening of access defined by said automobile, to a second position in which the said second guides are oriented longitudinally in respect to the automobile.

3. The wheelchair according to claim 1, wherein said rotating means includes an electric motor attached to the fixed base and a pinion which said motor drives, and a serrated chain engaged by said pinion.

4. The wheelchair according to claim 1, wherein said platform is supported on said fixed base by material of a low coefficient of friction.

5. The wheelchair according to claim 1, wherein means are provided between said support frame and said first guides for modifying the inclination of the latter in respect to the frame itself.

6. The wheelchair according to claim 5, wherein said means for modifying includes a control screw operatively engaged by a trim element compatible to the frame and operating with at least one of the said first guides, the said first guides being rotatably hinged to the frame.

* * * * *